United States Patent Office 2,834,976
Patented May 20, 1958

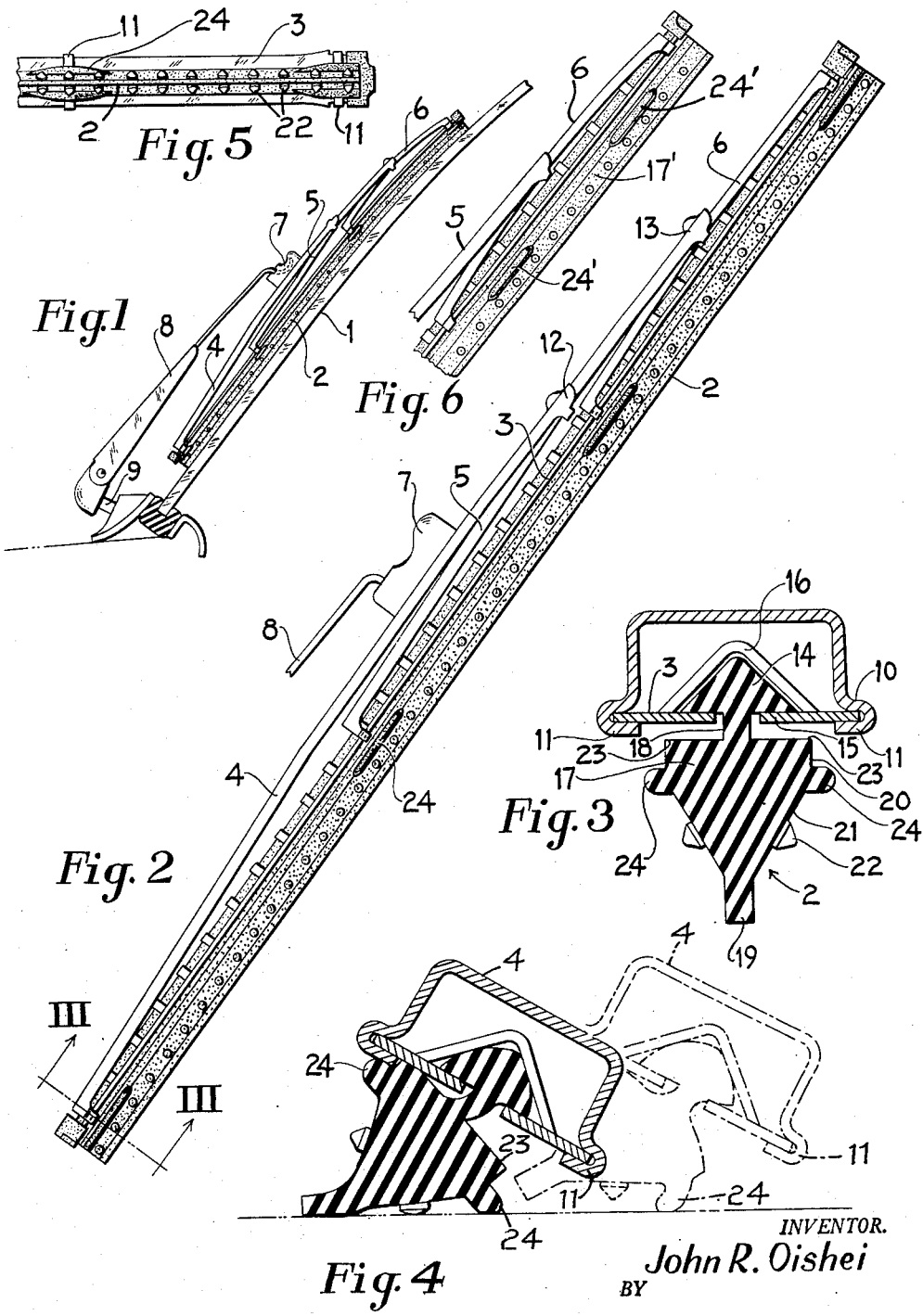

2,834,976

WINDSHIELD WIPER

John R. Oishei, Buffalo, N. Y., assignor to Trico Products Corporation, Buffalo, N. Y.

Application May 28, 1954, Serial No. 433,002

2 Claims. (Cl. 15—245)

This invention relates to the windshield cleaning field and particularly to a wiper for cleaning curved windshield surfaces.

The windshield wiper now currently used on automobiles for cleaning their curved windshields embodies a spring backing channel or strip for supporting the resilient wiping blade. The pressure of the wiper operating arm is distributed longitudinally of the wiper by a pressure applying frame having claw portions which slidably embrace the opposite side margins of the strip for flexing its supported blade into conformance to the surface contour. The backing is wide and overhangs the sides of the blade to give lateral support to it and also to effect the sliding embrace by the claws. When the wiping edge of the blade is moved laterally onto a partially wet surface, it will cling thereto and tug upon the wiper, producing a roll of the blade about its longitudinal axis and result in the forward edge of the backing strip dipping against the glass and scratching the same. The situation may be aggravated by other factors, such as the twisting of the wiper arm under the tug of the clinging blade, or possibly an improperly placed wiper shaft.

Under conditions of blade cling, the rubber blade body will begin to drag and turn on its angular sides alternately during opposite wiping movements. Normal wiping no longer is possible. The wiping lip of the blade collapses. The centrally positioned neck or hinge portion of the blade, engaged by inner channel margins of the backing, stretches and folds under while the outer margins of the channel holder are rotatively distorted under its spring tension. The normal fulcrum formed by the line of bearing contact of the rubber on the glass shifts from the centrally disposed position beneath the wide backing and off to one side. This allows the leading margin of the backing channel to be rotated to the point where contact of the straddling metal portions of the pressure distributing superstructure and the glass can take place. This rotation of the blade is made worse as more rubber surface is pulled down into contact with the glass and the tug is augmented to a dangerous degree that not only impairs the wiper but ruins the windshield. The use of continuous light beads is not the answer. A bead of sufficient bulk extending through the length of the blade to supply a supporting bearing on the glass stiffens the rubber wiping element, defeating its function of wiping properly under normal conditions, and requires a heavier spring arm for oscillating it.

The trouble from cling is accentuated at the crest of the sharper contours of curved glass, due in turn to the augmented arm pressure as the blade rises on its uphill travel to the crest.

In accordance with the present invention, the solution to the problem has been found in the use of projecting elevators which come into action in emergencies to take over the bulk of the arm pressure on a series of longitudinally abbreviated surfaces. These longitudinally separated tug-reducing projections are arranged to snap under the blade with an over-center motion that lifts the wiping edge of the blade out of surface contact and retains it so positioned for the remainder of the wiping stroke.

The primary object of the present invention is to provide a wiper which will guard against the scratching of the glass and thereby insure a blade that will wipe effectively over the crest of the curved surface in a more efficient manner.

A further object of the invention is to provide a wiping blade with means which will operate during abnormal conditions to lift the pressure distributing frame a safe distance from the glass to preclude a scratching contact of the claws therewith.

More specifically, the invention contemplates the provision of elevators in the form of lugs on the opposite sides of the blade body in a plane between the wiping edge and the backing strip and its conforming frame to snub or check the descent of the metal parts toward the glass. These snubbing lugs are normally nonfunctional but become operative when an abnormal roll of the blade interposes them between the surface and the blade to elevate the wiper and, concurrently, to rock the wiping lip out of operative contact. Thus, the wiper will fail to wipe on the stroke. This lifting action will be augmented by the trailing elevators which swing up against the underside of the backing strip to give added support thereto.

Therefore, a further object of the invention is to provide a structure in which the heretofore objectionable cling of the blade to a partially dry glass is put to advantage for removing the surface-conforming superstructure to a position in which the claws and backing strip are clear of the glass.

The foregoing and other objects of the invention will manifest themselves as this description progresses, reference being made to the accompanying drawing, wherein:

Fig. 1 is a view showing the improved blade operatively associated with a windshield;

Fig. 2 is an enlarged side elevation of the improved blade;

Fig. 3 is a cross sectional view of the blade as viewed about on line III—III of Fig. 2;

Fig. 4 is a similar cross sectional view depicting the snubbers or elevators in operation;

Fig. 5 is a bottom plan view of the wiper; and

Fig. 6 is a fragmentary side elevation of a modified embodiment.

Referring more particularly to the drawing, the numeral 1 designates a windshield, 2 a wiping blade, 3 its backing strip, 4, 5 and 6 the component parts of a pressure distributing frame, 7 an arm coupling attachment and 8 a spring-pressed arm which latter is fixed on an oscillatory shaft 9 at the lower side of the windshield. The pressure distributing frame comprises a primary lever 4, a secondary lever 5 and an equalizing yoke 6, the opposite ends of which latter, and the inner ends of the primary and secondary levers being provided with pressure applying feet 10 that straddle the backing strip 3 and slide upon the opposite side margins thereof, the feet being retained thereon by the claw extensions 11. The primary lever 4 leans outwardly upon the secondary lever 5 and is rockably connected to the medial portion thereof at 12. The secondary lever likewise leans outwardly upon the yoke 6 and is connected to the medial portion thereof at 13. The arm coupling 7 is fixed on the primary lever 4.

The wiping blade 2 is formed along one longitudinal margin with a retaining bead 14 for being confined by the underlying shoulders 15 within a channel as defined by the longitudinally arranged series of cross straps 16 of the flexible backing strip 3. The anchoring bead 14 is joined to the blade body 17 by a reduced neck 18, the body being relatively heavy and attenuating toward the opposite longitudinal margin to form a thin wiping lip or edge 19. At its thickest portion, the body has parallel opposite side faces 20 adjacent the neck and these faces are joined by converging faces 21 to the wiping lip. Rows of skid knobs 22 are provided on the faces 21 adjacent the lip for modifying the tenacity with which the wiping edge may cling to a partially dry surface. During an interval of abnormal cling of the wiping lip the corresponding body shoulder 23 will or may contact the underface of the backing strip 3 as a stop to determine the position of the body against the stretching of the neck 18.

As the wiper is moved back and forth across the windshield surface and the wiping edge rides onto a partially dry portion thereof, the wiping lip will cling abnormally and will tug upon the resilient body 17 to bring the normally idle skid knobs down upon the glass for relieving the pressure more or less.

The foregoing is more fully described in my copending application Serial No. 222,228 now Patent No. 2,733,469.

There are times when the torque on the body is abnormally excessive and it is during these intervals that the severity of the tug will bring the claws 11, if not the forward edge of the backing strip, down upon the glass surface in scratching contact therewith. Also, the tendency for the blade to roll is greater by reason of the hugging of the blade to the curved surface, especially on the crest of a curving contour.

In accordance with the present invention, provision is made to guard against injury to the windshield in the form of a longitudinal series of short beads or lugs 24 which are located on each side face 20 at the widest portion of the blade body and beneath the flexible backing but above the skid knobs 22. The lugs therefore increase the width of the blade body at these locations and have greater lateral extent than the skid knobs. Consequently, when in contact with the glass, they act as elevators to cam the entire wiper structure upwardly and to impart a rotational twist to the blade about its longitudinal axis to bring the trailing or rear lugs up against the underside of their respective overhanging claws 11. This is more readily comprehended from the showing in Fig. 4 which illustrates in solid lines the wiper body being subjected to the tug of the wiping edge which initially lowers the elevators down upon the glass, and in broken lines the wiping edge after it has been lifted out of wiping contact due to an increased rolling under of the blade. The formation of the individual elevator lugs avoids an objectionable stiffening of the blade body for its full length and retains the natural tendency of it to flex laterally under a lighter arm pressure. The spacing of the elevators along the blade body facilitates their folding under the body with a snap action wherein they move through a central position, or across a dead-center position, against the inherent resiliency of the blade body, as depicted by the broken lines in Fig. 4.

The result gained by these wiper elevators is a positive lifting of the blade unit 2, 3, and its pressure distributing superstructure at a time when the blade backing support 3, 4, 5, 6, and its actuating arm are subjected to the greatest torque. Only under conditions of extreme cling do the elevators come into service, and when they function they serve to support the metal parts composing the foldable superstructure, which latter term comprehends the backing strip, a safe distance above the glass surface. They act as a positive preventative against injury to the glass and additionally serve in a precautionary measure to protect the windshield from harm incidental to an abuse of the wiper and its supporting arm, such as by inadvertently angularly displacing them which would cause the wiper to travel a greater distance over the crest of a curved contour. A like detrimental situation may follow a slight misalignment of the wiper shaft with respect to the windshield, or a careless handling of the wipers and arms encountered during a car wash, or an arm twist which may cause abnormal layover of the blade on the windshield, in which instances the elevators when functioning will cause the wiper to miss with a regularity that attracts the attention of the motorist and cautions him of a fault in the wiper system that should be corrected through a proper replacement or by a reforming of the parts, as the case may be.

Preferably the elevators or lifting lugs are disposed immediately beneath the claws 11 but not necessarily. As shown in Fig. 6 they may be longitudinally offset from the claws along the opposite sides of the body 17', as shown at 24'. Again, their number may be increased to insure protection for the glass against the resilient flexible backing strip dipping unduly at its forward edge.

The individual lug formation in series preserves the desired flexibility of the blade for effective surface conformance without the necessity of a heavier arm pressure and without imposing an increased load upon the light windshield cleaner motor. The elevators serve as sustaining spacers for supporting the superstructure after they have been elastically snapped past center. This movement of the elevators is an individual movement and occurs only where the lip cling is abnormal and most pronounced. Should the windshield surface be wet only in spots, then a situation might arise wherein only one elevator would become operative. Consequently, the need for individual performance of the elevators is important for the greatest efficiency. Therefore, the elevators become a vital means in the utilization of the deeper curved shields of current production in which the blade and arm are required to be kept in strict alignment and definite relationship to guard against the mutilation of the glass surface.

The foregoing description has been given in detail without thought of limitation since the concept of the wiper lifting means may assume other physical embodiments without departing from the spirit of the invention or the scope of the appended claims.

What is claimed is:

1. A windshield wiper comprising a blade and superstructure, said blade comprising a body having a relatively thick main portion defined in part by spaced side walls, the side walls being recessed for receiving a backing strip therein for connection with the superstructure, said body including a wiper portion having its side faces converging to terminate in a flexible wiping edge, skid knobs spaced generally medially along each converging side face for preventing cling of side wiping edges, and spaced elongate elevator means formed integral with and extending longitudinally of each side of the blade body at the junction of the converging faces and the side walls, said elevator means extending laterally of said knobs to lift the wiper and to hold its superstructure out of engagement with the surface being wiped.

2. A windshield wiper comprising a flexible blade and superstructure, said blade comprising an anchoring bead joined by a hinge-forming neck portion to a laterally swingable and relatively thick body defined in part by spaced side walls, said neck portion providing a recessed formation, a flexible elongate backing strip engaged in the recessed formation and connected to the superstructure for applying surface conforming pressure to the blade, said strip having its opposite side margins overhanging the side walls, said laterally swingable body including a wiper portion having side faces converging from the side walls and terminating in a flexible wiping edge, and elongate elevator means formed integral with the side walls of said laterally swingable body and extending longitudinally of the blade body adjacent the converging faces, said elevator means projecting from said side walls and fore and aft from the wiper when moving laterally to cooperatively lift on the wiper and its superstructure to hold the latter out of engagement with the surface being traversed, said elevator means being normally inoperative but when the wiping edge clings abnormally the forward elevator means is adapted to engage the surface and the trailing elevator means is adapted to engage the overhanging margin of the backing strip to jointly exert a lifting force for lifting on the wiper and its superstructure.

References Cited in the file of this patent

UNITED STATES PATENTS

| | | |
|---|---|---|
| 2,306,946 | Horton | Dec. 29, 1942 |
| 2,543,383 | Scinta et al. | Feb. 27, 1951 |
| 2,548,090 | Anderson | Apr. 10, 1951 |
| 2,700,785 | Oishei | Feb. 1, 1955 |
| 2,733,469 | Oishei | Feb. 7, 1956 |

FOREIGN PATENTS

| | | |
|---|---|---|
| 854,122 | France | Jan. 4, 1940 |